US006789851B2

(12) United States Patent
Smith (10) Patent No.: US 6,789,851 B2
(45) Date of Patent: Sep. 14, 2004

(54) CHILD'S SLEEP COLLAR

(76) Inventor: Carol J. Smith, 196 Main St., Hanson, MA (US) 02341

( * ) Notice: Subject to any disclaimer, the term of this patent is extended or adjusted under 35 U.S.C. 154(b) by 0 days.

(21) Appl. No.: 10/370,610

(22) Filed: Feb. 24, 2003

(65) Prior Publication Data

US 2003/0127899 A1 Jul. 10, 2003

Related U.S. Application Data

(63) Continuation of application No. 09/934,515, filed on Aug. 23, 2001, now Pat. No. 6,523,901.
(60) Provisional application No. 60/228,287, filed on Aug. 28, 2000.

(51) Int. Cl.[7] ................................................. A47C 1/10
(52) U.S. Cl. ........................ 297/392; 297/391; 297/397; 297/219.12; 5/640
(58) Field of Search ................................. 297/392, 391, 297/250.1, 219.12, 220, 487, 488, 464, 393, 396; 5/655, 636, 637, 640

(56) References Cited

U.S. PATENT DOCUMENTS

| 4,031,578 A | | 6/1977 | Sweeney et al. |
|---|---|---|---|
| 4,440,443 A | | 4/1984 | Nordskog |
| 4,607,885 A | | 8/1986 | del Fierro |
| 4,617,691 A | * | 10/1986 | Monti et al. ................... 5/640 |
| 4,738,488 A | | 4/1988 | Camelio |
| 4,838,611 A | | 6/1989 | Talaugon |
| 5,064,245 A | | 11/1991 | Stephens |
| 5,108,152 A | | 4/1992 | Reilly et al. |
| D353,966 S | | 1/1995 | Rogers |
| 5,586,351 A | | 12/1996 | Ive |
| D395,781 S | | 7/1998 | Golder |
| D427,473 S | | 7/2000 | Reithmeier |
| 6,139,100 A | | 10/2000 | Baskin-Lockman et al. |
| 6,266,832 B1 | | 7/2001 | Ezell |
| 6,523,901 B2 | * | 2/2003 | Smith .......................... 297/392 |
| 2002/0043859 A1 | | 4/2002 | Smith |

FOREIGN PATENT DOCUMENTS

EP    0285371    *    3/1988

* cited by examiner

*Primary Examiner*—Peter M. Cuomo
*Assistant Examiner*—Erika Garrett
(74) *Attorney, Agent, or Firm*—Banner & Witcoff, Ltd.

(57) ABSTRACT

A child's sleep collar for use with a child safety seat that includes a pair of collar supports, forming a left and a right collar support. Each of the collar supports has a body, an attachment end, and a coupling end. The attachment end includes an attachment strap and is designed to attach respectively to a left or right belt positioning clip of a child safety seat. The coupling end of each collar support forms a generally planar surface and has a left or right collar fastener respectively attached to the planar surface. Each of the collar fasteners is designed to releasably engage the other collar fastener. When the collar fasteners are attached, the left planar surface faces the right planar surface. The body of each collar support includes a cushion fill material and is preferably tubular.

20 Claims, 6 Drawing Sheets

CHILD'S SLEEP COLLAR

CROSS-REFERENCE TO RELATED APPLICATIONS

This application is a continuation of Ser. No. 09/934,515 filed Aug. 23, 2001, now U.S. Pat. No. 6,523,901, issued Feb. 25, 2003, which claim the benefit of U.S. Provisional Application Ser. No. 60/228,287 filed Aug. 28, 2000 entitled "Child's Sleep Aid Collar," both of which are incorporated by reference in their entirety.

FIELD OF THE INVENTION

The present invention relates to child safety seat for a motor vehicle and a child's sleep collar or child's headrest for use with a child safety seat. More particularly, the present invention relates to an apparatus for supporting the head of a forward facing sleeping child while riding in a car safety seat.

BACKGROUND OF THE INVENTION

Conventional child safety seats are designed to secure children in vehicles and to restrain them in the event of an impact. Beginning at around 1 year of age, children sit upright in forward facing car seats, often for long periods of time. Toddlers and older children in the range of 30–80 pounds typically sit upright in high back booster seats. In any child safety seat, the potential for a child to doze or fall asleep while sitting in the car seat is high. When this occurs in a forward facing car seat or booster seat, the child's head typically sags, droops, or hangs unsupported in a forward or lateral position from the neck. This hanging position is uncomfortable for the child and may result in excessive strain on the neck muscles or other injuries.

In order to address the lack of neck and head support of conventional child safety seats, various designs have been proposed. Many of these designs are adapted to attach to a conventional child safety seat and to provide lateral head support, but they typically provide only minimal frontal head support. Such headrests typically leave an opening at the front, which minimizes strangulation hazards, but which also minimizes frontal head support. For example, Baskin-Lockman et al., U.S. Pat. No. 6,139,100, discloses a headrest that is detachably connectable to the backrest portion of a child safety seat. Although the Baskin-Lockman headrest provides lateral support to a child's head, it merely attempts to deter forward motion of a child's head through the use of a pillow shaped lower portion on its lateral supports. The Baskin-Lockman headrest does not positively support the chin or otherwise provide positive support to a child's head as it droops forward.

To avoid any strangulation concerns and yet positively support a child's chin, other known child headrest designs have been proposed that surround the child's neck, but are wholly unattached to the child safety seat. Headrests such as these provide frontal and lateral support, but because they are unattached to a seat, they are easy for a person to misplace or to forget to install. For example, Rogers, U.S. Pat. No. D353,966, discloses a triangular headrest that surrounds a child's neck, but does not attach to a seat. The Roger's headrest uses a hook and loop fastener to connect the forward legs of its headrest to each other in order to surround a child's neck. The hook and loop fastener of the Roger's headrest uses the hook and loop fastener in the shear direction to positively attach the headrest legs to each other. As such, the Roger's headrest is not designed to release in front of a child's chin with forward motion of the child relative to the headrest. Rather, the Roger's headrest is designed to remain firmly attached around the child's neck, but not attached to the child safety seat.

As understood from the foregoing discussion, there is a need for a device attached to a child safety seat, which provides lateral and frontal support to the head of a sleeping child restrained in the child safety seat, and which does not present a strangulation hazard to the child in the event of an accident.

SUMMARY OF THE INVENTION

The present invention has been developed to overcome the foregoing limitations and disadvantages of conventional headrests for child safety seats, and to generally fulfill the need in the art for a child's sleep aid that provides forward and lateral support to a child's head, attaches to a child safety seat, but that does not restrain a child's neck in the event of an accident.

According to the invention, there is provided a child's sleep collar for use with a child safety seat that includes a pair of collar supports, forming a left and a right collar support. Each of the collar supports has a first and a second end. The first end is designed to attach respectively to a left or right belt positioning clip of a child safety seat. The second end of each collar support forms a generally planar surface and has a left or right collar fastener respectively attached to the planar surface.

Each of the collar fasteners are designed to releasably engage the other collar fastener. When the collar fasteners are attached, thereby coupling the left collar support to the right collar support, the left planar surface faces the right planar surface. Although almost any fastener that releasably engages an opposing fastener may be appropriate, it is preferable to use fasteners that, when coupled, provide a greater retention force between the fasteners in the shear direction than in the tensile direction.

Each of the collar supports preferably further includes a body having an attachment end and a coupling end. Each coupling end includes the respective collar support second end, planar surface, and collar fastener. An attachment strap is preferably connected to each attachment end for attaching to a respective belt positioning clip of a child safety seat. Further, each attachment strap preferably forms a loop that connects around a belt positioning clip and retains the loop using a hook and loop fastener.

The body includes a cushion fill material and is preferably tubular. In one aspect of the invention, each body is substantially arcuate and is adapted to translate a force applied ly against the arcuate body, when the bodies are coupled to each other and are attached to a child safety seat, into a tensile force between the fasteners. In another aspect of the invention, each body is substantially straight and is adapted to translate a force applied perpendicularly against the straight body into a tensile force between the fasteners. This occurs when the force is applied in a direction substantially perpendicular to the straight body and away from the opposing body when the bodies are coupled to each other and are attached to a child safety seat.

According to another aspect of the invention, either the left or the right collar support is substantially U-shaped, and the other collar support is substantially straight. Additionally, according to a different aspect of the invention, either the left or the right collar support is substantially V-shaped, and the other collar support is substantially straight.

According to yet another aspect of the invention, there is provided a child safety seat for a motor vehicle that includes a seat base, a seat back attached to the seat base, a pair of belt positioning clips for receiving a motor vehicle shoulder belt, and child's sleep collar as recited above.

It is an object of the present invention to provide a child's sleep collar for use with a child safety seat that provides lateral and frontal support to a child retained within a child safety seat.

It is another object of the present invention to provide a child's sleep collar for use with a child safety seat, which attaches to the child safety seat, and which closes in front of the neck of a child retained within a child safety seat, but releases across a child's neck in the event of an impact or car accident.

It is yet another object of the present invention to provide a child's sleep collar for use with a child safety seat that adjustably and releasably attaches to the child safety seat.

It is a further object of the present invention to provide a child's sleep collar for use with a child safety seat that attaches to the belt positioning clips of a child safety seat.

It is another object of the present invention to provide a child safety seat that includes a child's sleep collar that provides lateral and frontal support to a child retained in the seat.

It is another object of the present invention to provide a child safety seat that includes a child's sleep collar that closes in front of the neck of a child retained within the seat, and that releases across a child's neck in the event of an impact or car accident.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1–5, there is shown a child's sleep collar for use with a child safety seat according to the first preferred embodiment of this invention. The child's sleep collar 10 is shown installed on a child safety seat 12, shown here as a booster seat. The child safety seat 12 is shown installed in the second row of seats of a vehicle 14. In this embodiment, the child's sleep collar 10 is a two part U shape pillow-like collar that generally includes a pair of collar supports forming a left collar support 16 and a right collar support 18.

Figure 5:
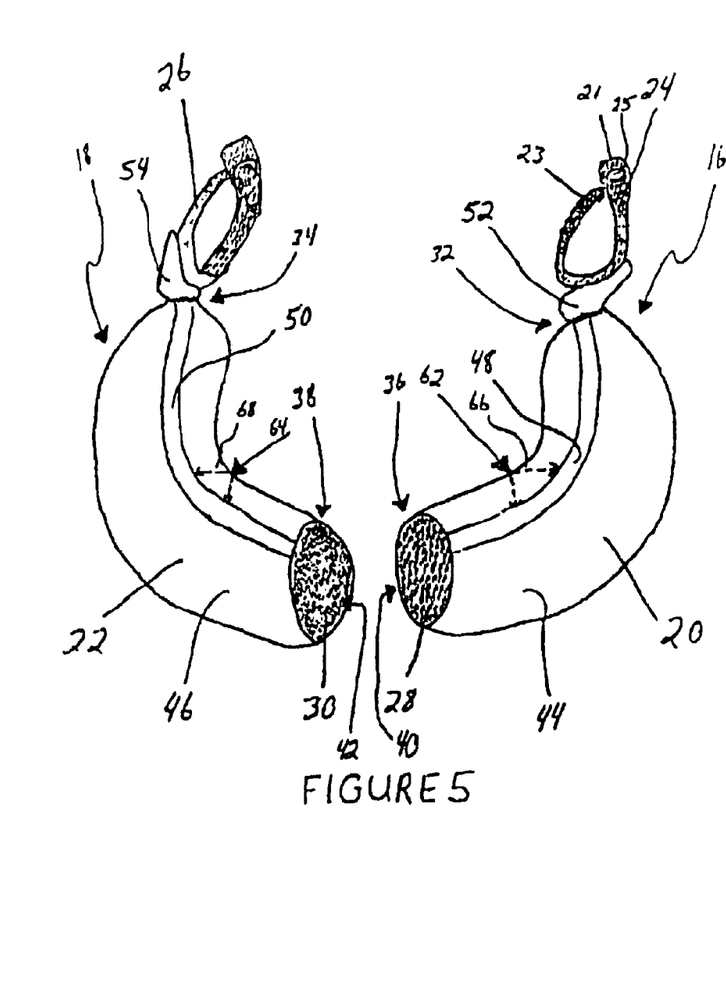
FIG. 5 is an enlarged front view of the child's sleep collar of FIG. 1, shown detached from the child safety seat.

With particular reference to FIG. 5, each collar support 16, 18 generally includes a body 20, 22; cushion fill material (not shown) retained within the body; an attachment strap 24, 26; and a fastener 28, 30. Each body 20, 22 has an attachment end 32, 34, and a coupling end 36, 38. Each attachment strap 24, 26 is attached to the respective attachment end 32, 34. Each coupling end 36, 38 defines a substantially planar surface 40, 42, and each fastener 28, 30 is disposed along the respective planar surface 40, 42.

Each body 20, 22 further includes a tubular portion 44, 46 and an optional reinforcement strip 48, 50. Each tubular portion 44, 46 is preferably made from at least one layer of cotton, cotton blend, cotton/polyester fabric or other like soft durable washable material that is formed into a generally elbow-shaped tube. To create each tubular portion 44, 46, the fabric is cut from pattern layouts and sewn to form an elbow-shaped tube. A thin strip piece of fabric may optionally be sewn on the inner side of the elbow to form a reinforcement strip 48, 50. At the coupling nd 36, 38 of each body, a circle of fabric (not shown) is sewn to form the substantially planar surface 40, 42.

After the tubular portion 44, 46 is formed and the substantially planar surface 40, 42 is attached, the body 20, 22 is preferably turned inside out to keep the excess selvage material within the tube. The fastener 28, 30 is preferably sewn to the circle of fabric on the outside of the body 20, 22, and is thereby disposed along the planar surface 40, 42. In this embodiment, the fastener 28, 30 is one side of a hook and loop fastener formed as a disc that is sewn on to the circle of fabric and thereby covers it.

Each tubular portion 44, 46 is stuffed with cushion fill material (not shown) such as polyester fiber or foam hypoallergenic material. The tubular portion is preferably stuffed with the cushion fill material (not shown) to within approximately 2 inches of the attachment end 32, 34. The attachment end 32, 34 is preferably folded or pleated together to form an elongated tapered tab 52, 54 and then stitched closed. The attachment strap 24, 26 is sewn or otherwise affixed to the tapered tab 52, 54.

Each attachment strap 24, 26 is preferably adjustable to allow the collar supports 16, 18 to be modified to comfortably fit the seat occupant. In this embodiment, the attachment straps 24, 26 are each made from a single strap having the hook side of a hook and loop fastener one side, and the loop side on the other. Each of the strips 24, 26 additionally have a buckle end 21 forming a hole 25 therethrough, and a lead end 23.

In use, each attachment strap 24, 26 attaches the respective collar support 16, 18 to a child safety seat 12 or other seating conveyance, thereby holding the collar support in position. As shown in FIGS. 1–5, the child's sleep collar 10 is preferably attached to a child's booster seat 12 having a left belt positioning dip 56 and a right belt positioning clip 58. The left collar support 16 is attached to the left belt positioning clip 56 using the left attachment strap 24, and the right collar support 18 is similarly attached to right belt positioning clip 58 using the right attachment strap 26.

Each of the collar supports 16, 18 are attached by threading the lead end 23 of each attachment strap around and behind the respective belt positioning clip 56, 58, and through the hole 25 formed in the buckle end 21. Each attachment strap is then secured by coupling the hook and loop sides of each strip to one another where the lead end 23 overlaps the loop end 21. Although the collar supports are shown in use with a child in a booster seat, one having skill in the art recognizes that they may be used by adults or children in a variety of seats such as car seats, airplane seats, train seats, or the like.

Figure 1:
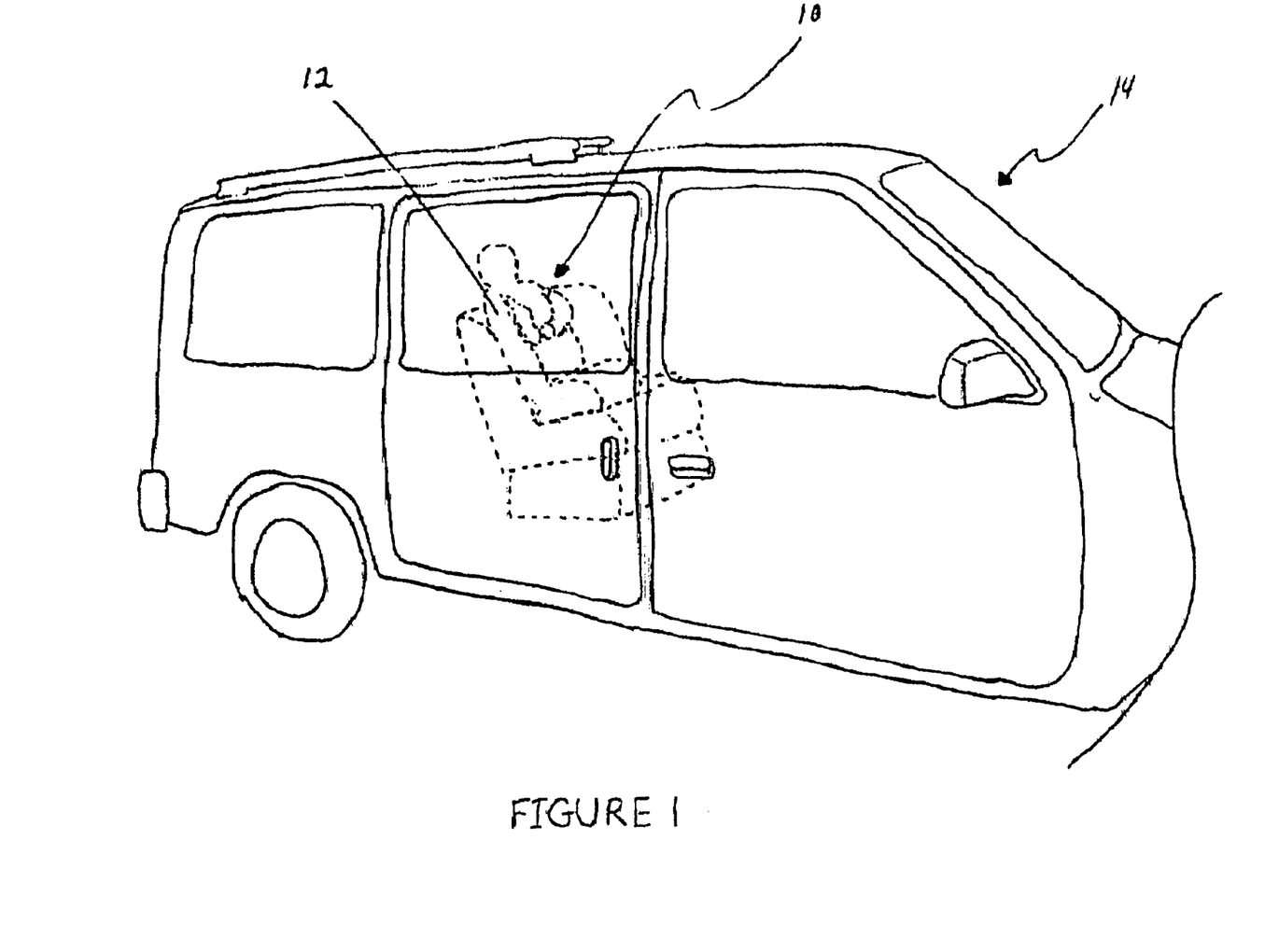
FIG. 1 is a perspective view of a child's sleep collar of the present invention, showing the sleep collar installed on a child safety seat located within a motor vehicle according to the preferred embodiment of the present invention.
Figure 2:
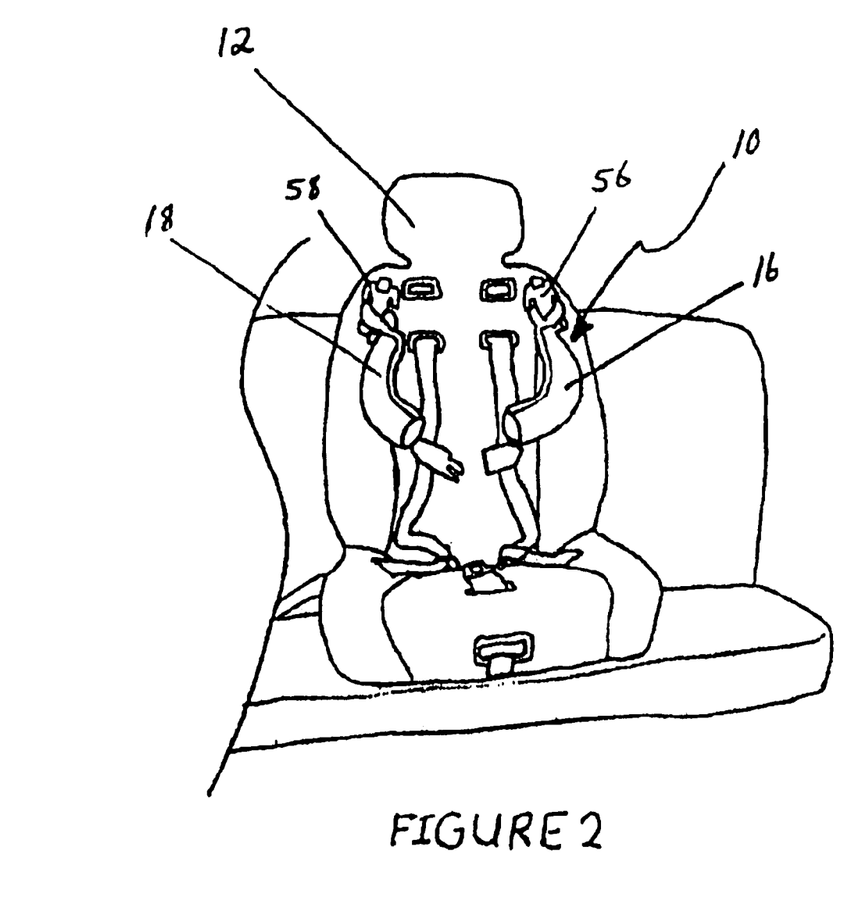
FIG. 2 is a front view of the child's sleep collar of FIG. 1, showing the sleep collar installed on a child safety seat without a child sitting in the seat.
Figure 3:
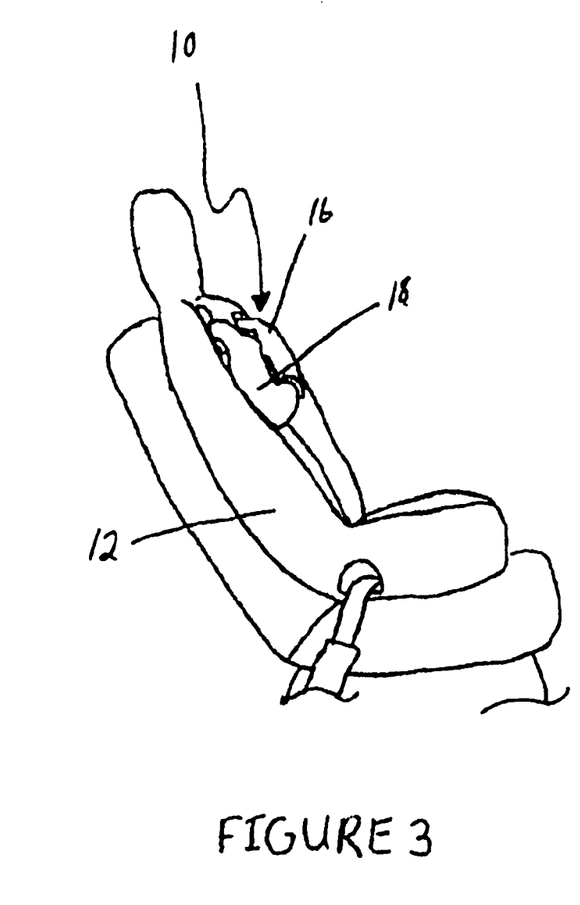
FIG. 3 is a side view of the child's sleep collar of FIG. 2, showing the sleep collar installed on a child safety seat without a child sitting in the seat.
Figure 4:
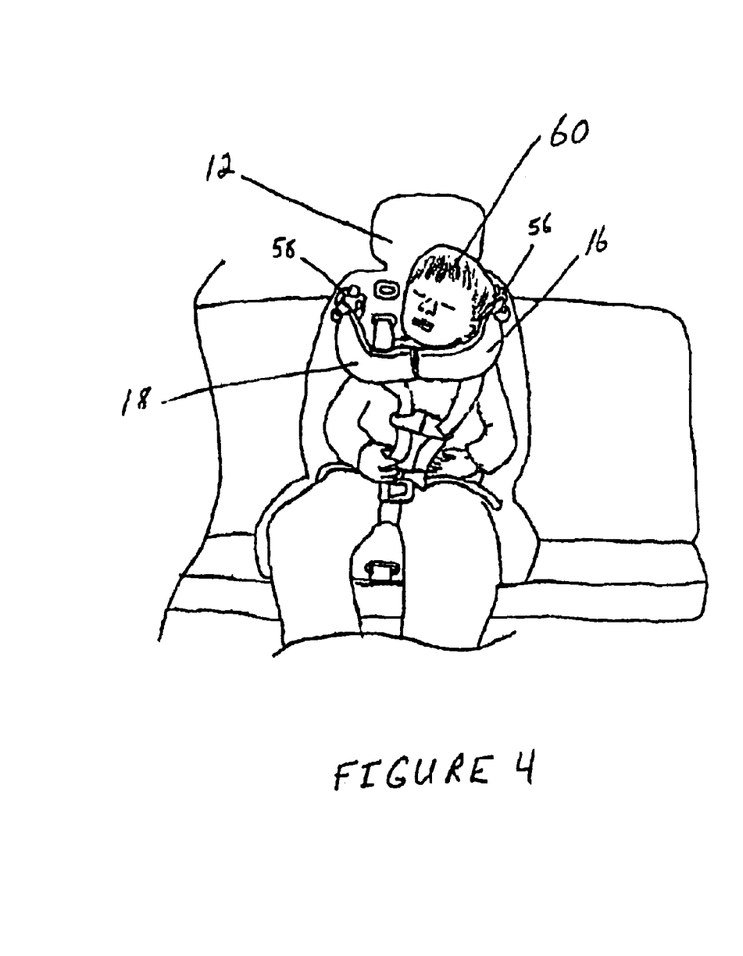
FIG. 4 is a front view of the child's sleep collar of FIG. 1, showing the sleep collar installed on a child safety seat, and in use by a child retained in the safety seat.

As shown in FIG. 4, when a child 60 is retained in the seat 12, the left collar support 16 is coupled to the right collar support 18 by attaching the left fastener 28 to the right fastener 30. When coupled, the child's sleep collar surrounds the neck of the child 60, and provides lateral support to the child's head and neck, as well as frontal support. Although the child's sleep collar 10 is coupled across the front of the child's neck, the left collar support 16 is designed to de-couple from the right collar support 18 in the event of excessive forward motion of the child's neck. This is accomplished in the preferred embodiment through the arcuate shapes of each collar support 16, 18 and the use of hook and loop fasteners 28, 30.

When the child 60 is sleeping or otherwise casually resting forward against one or both of the collar supports 16, 18, a shear force is generally transferred to the hook and loop fasteners 28, 30. Because hook and loop fasteners provide much greater retention in the shear direction than in the tensile direction normal to the coupled fasteners, the hook and loop fasteners 28, 30 remain coupled when the child is resting against the safety collar.

When the child 60 is sleeping or otherwise casually resting laterally against the one of the collar supports 16, 18, a generally tensile force is transferred to the hook and loop fasteners 28, 30. Because the attachment straps 24, 26 allow limited lateral motion of each collar support 16, 18 in response to lateral force on one of the collar supports 16, 18, and because a resting child does not generally apply significant lateral forces to the collar supports, the hook and loop fasteners 28, 30 remain coupled as the child 60 casually rests his head laterally against one of the collar supports 16, 18.

In the event of an accident or other significant forward motion of the child, however, the collar supports 16, 18 de-couple. In such a situation, each of the collar supports 16, 18 tightens around the neck of the child 60 as the child moves forward against the sleep collar 10. By moving against the sleep collar, the neck of the child 60 radially applies a force 62, 64 against each of the arcuate bodies 20, 22. Each of the radial forces 62, 64 has a force vector 66, 68 acting opposite to each other and normal to the hook and loop fasteners 28, 30. As such, the opposing force vectors 66, 68 act in the tensile direction to de-couple the hook and loop fasteners 28, 30. Accordingly, the left collar support 16 de-couples from the right collar support 18 during an accident or other forward motion of the child relative to the child safety seat 12. In the present embodiment, a de-coupling force in the tensile direction of around 8–10 pounds per square inch is sufficient to de-couple the hook and loop fasteners 28, 30.

One skilled in the art recognizes that although the preferred embodiments include hook and loop fasteners for the fasteners 16, 18, other fastening devices such as snaps, clips, adhesive strips, magnets, or the like may be used. The fasteners 16, 18 preferably possess greater retention strength in the shear direction versus the tensile direction; however, this is not necessary. The release point of the fasteners 16, 18 may be adjusted to ensure that the collar supports 16, 18 generally remain coupled during casual use of the child's sleep collar 10, and yet de-couple as the child moves forward to prevent strangulation or other injury to the child's neck. Likewise, one recognizes that other attachment devices such as snaps, clips, adhesive strips, magnets, buttons, and the like, or other methods of selectively attaching each of the collar supports 16, 18 to the child's safety seat 12, may also be used.

Figure 6:
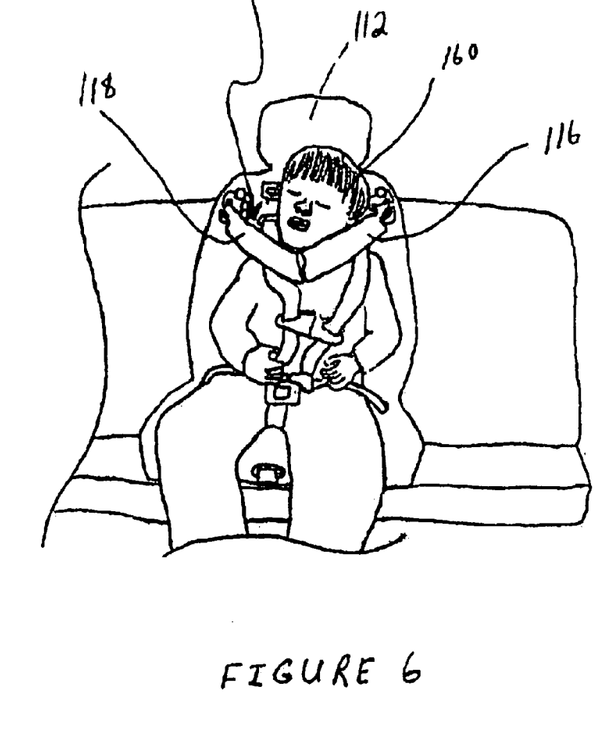
FIG. 6 is a front view of the child's sleep collar in accordance with the second embodiment, showing the sleep collar installed on a child safety seat and in use by a child retained in the seat.
Figure 7:
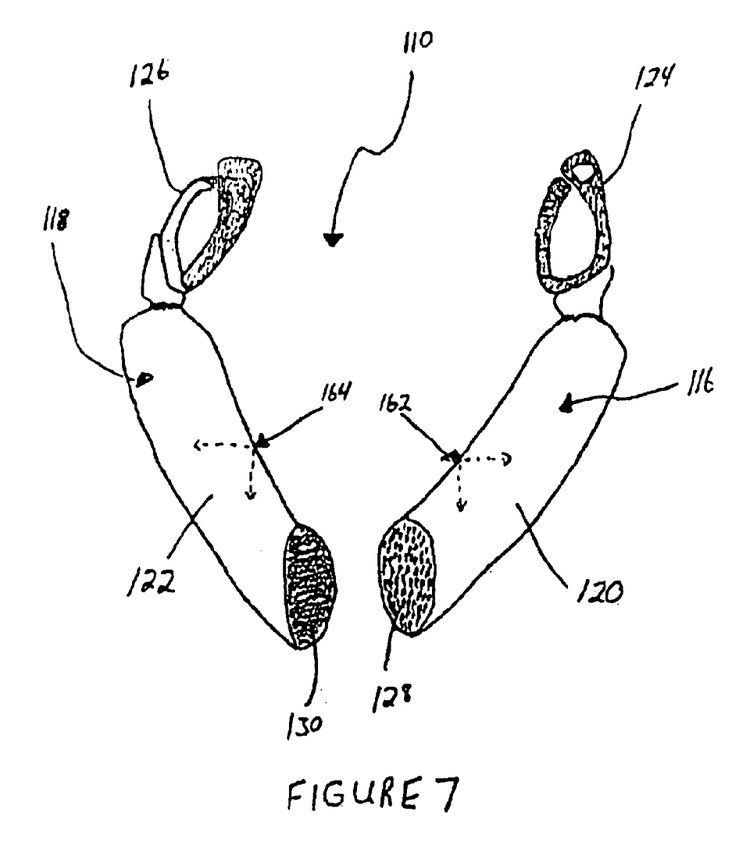
FIG. 7 is an enlarged front view of the child's sleep collar of FIG. 6, shown detached from the child safety seat.

Referring now to FIGS. 6 and 7, there is shown a child's sleep collar 110 for use with a child safety seat according to the second preferred embodiment of this invention. The second preferred embodiment differs from the first preferred embodiment in that the body 120, 122 of each of the collar supports 116, 118 are substantially straight rather than arcuate. Except for preferences and aspects related to the straight shape of the collar supports, all other preferences and aspects are the same as the first preferred embodiment.

In the second preferred embodiment, when the fasteners 128, 130 are coupled, the child's sleep collar 110 is generally V-shaped about a child's neck. In the event of an accident or other forward motion of the child 160, each of the collar supports 116, 118 tightens around the neck of the child as the child moves forward against the sleep collar 110. By moving against the sleep collar, the neck of the child 160 applies a substantially normal force 162, 164 against each of the substantially straight bodies 120, 122. Each of the normal forces 162, 164 has a force vector 166, 168 acting opposite to each other and normal to the hook and loop fasteners 128, 130. As such, the opposing force vectors 166, 168 act in the tensile direction to de-couple the hook and loop fasteners 128, 130. Accordingly, the left collar support 116 de-couples from the right collar support 118 during an accident or other forward motion of the child relative to the child safety seat 112.

Figure 8:
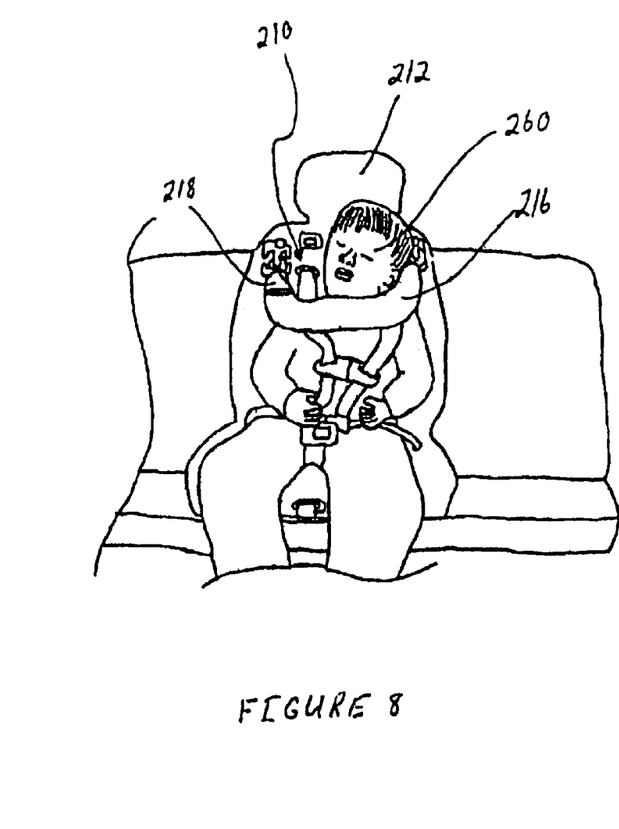
FIG. 8 is a front view of the child's sleep collar in accordance with the third embodiment, showing the sleep collar installed on a child safety seat and in use by a child retained in the seat.
Figure 9:
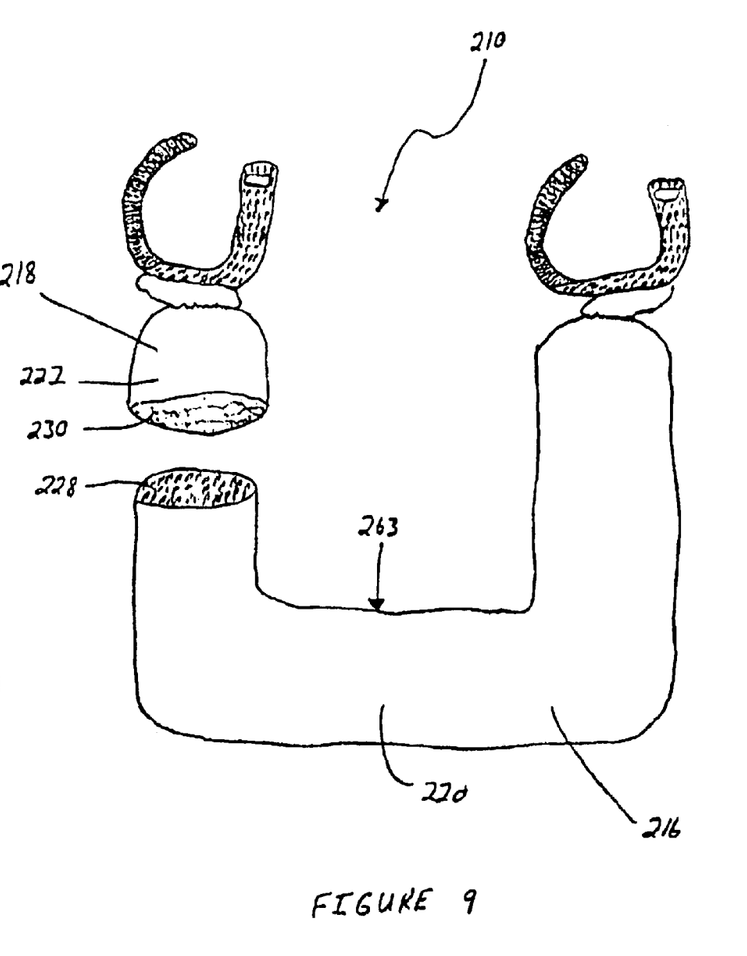
FIG. 9 is an enlarged front view of the child's sleep collar of FIG. 8, shown detached from the child safety seat.

Referring now to FIGS. 8 and 9, there is shown a child's sleep collar 210 for use with a child safety seat according to the third preferred embodiment of this invention. The third preferred embodiment differs from the first preferred embodiment in that the body 220 of the left collar support 216 is substantially U-shaped, forming a hook, and the body 222 of the right collar support 218 is much shorter and substantially straight, wherein when coupled, the child's sleep collar 210 is substantially U-shaped. Except for preferences and aspects related to the different length and shape of the left collar support 216 relative to the right straight collar support 218, all other preferences and aspects are the same as the first preferred embodiment.

In the third preferred embodiment, when the fasteners 228, 230 are coupled, the child's sleep collar 210 is generally U-shaped about a child's neck. In the event of an accident or other forward motion of the child 260, a forward force 263 is applied against the left collar support 216 along the inside of the left body 220. As such, the forward force 263 acts in the tensile direction to de-couple the hook and loop fasteners 228, 230. Accordingly, the left collar support 216 de-couples from the right collar support 218 during an accident or other significant forward motion of the child relative to the child safety seat 212.

Figure 10:
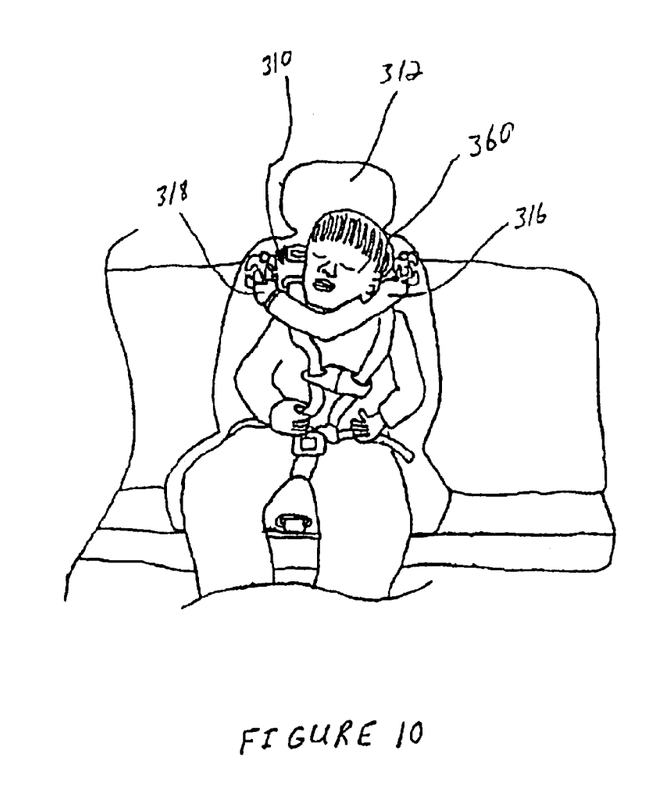
FIG. 10 is a front view of the child's sleep collar in accordance with the fourth embodiment, showing the sleep collar installed on a child safety seat and in use by a child retained in the seat.
Figure 11:
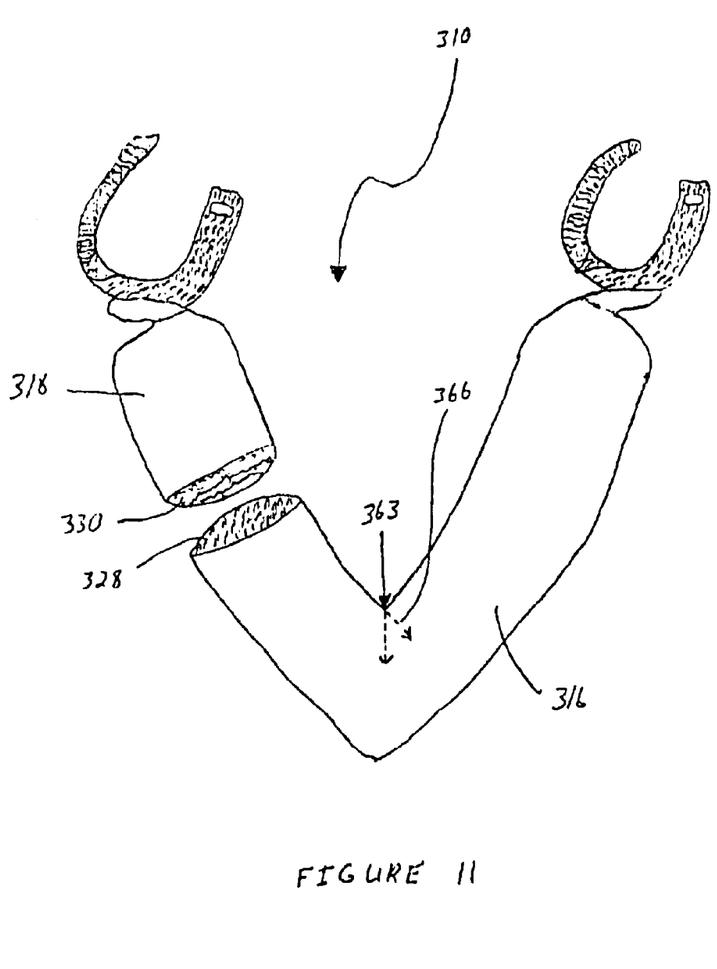
FIG. 11 is an enlarged front view of the child's sleep collar of FIG. 10, shown detached from the child safety seat.

Referring now to FIGS. 10 and 11, there is shown a child's sleep collar 310 for use with a child safety seat according to the fourth preferred embodiment of this invention. The fourth preferred embodiment differs from the third preferred embodiment in that the body 320 of the left collar support 316 is substantially V-shaped, forming a hook, rather than being substantially U-shaped. Except for preferences and aspects related to the different shape of the left collar support 316, all other preferences and aspects are the same as the third preferred embodiment.

In the fourth preferred embodiment, when the fasteners 328, 330 are coupled, the child's sleep collar 310 is generally V-shaped about a child's neck. In the event of an accident or other forward motion of the child 360, a forward force 363 is applied against the left collar support 316 along the inside of the left body 320. The forward force 363 has a force vector 366 acting opposite and normal to coupling force between the hook and loop fasteners 328, 330. As such, the force vector 366 acts in the tensile direction to de-couple the hook and loop fasteners 328, 330. Accordingly, the left collar support 316 de-couples from the right collar support 318 during an accident or other significant forward motion of the child relative to the child safety seat 312.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A collar for use with a seat, the collar comprising:
   a first collar support having an attachment end for attaching to the seat and a coupling end, the coupling end having a fastener for releasably engaging a fastener of a corresponding collar support; and
   a second collar support having an attachment end for attaching to the seat and a coupling end, the coupling end having a fastener for releasably engaging the fastener of the corresponding first collar support, the second collar support being separate from the first collar support when the coupling end is disengaged from the first collar support;
   wherein the collar supports form a closed loop with the seat around the neck of an occupant of the seat when the fasteners engage each other.

2. The collar recited in claim 1, wherein the fastener of a first one of the collar supports is selected from the group consisting of a first side of a hook and loop fastener and a male side of a snap.

3. The collar recited in claim 2, wherein the fastener of a second one of the collar supports is selected from the group consisting of a second side of a hook and loop fastener and a female side of a snap.

4. The collar recited in claim 1, wherein each one of the collar supports are substantially arcuate.

5. The collar recited in claim 1, wherein one of the collar supports comprise an attachment strap connected to the respective attachment end.

6. The collar recited in claim 5, wherein the attachment strap forms a loop, and wherein a first side of the attachment strap includes the first side of a hook and loop fastener, and a second side of the attachment strap includes the second side of a hook and loop fastener.

7. The collar recited in claim 1, wherein each one of the collar supports comprise a body and cushion fill material retained within the body.

8. The collar recited in claim 1, wherein each collar support comprises a reinforcement strip.

9. The collar recited in claim 1, wherein the coupling end of each collar support defines a substantially planar surface, and wherein each of the planar surfaces face each other when the fastener are engaged.

10. The collar recited in claim 1, wherein each collar support is adapted to translate a force applied against an inside portion of the collar support when the fist collar fastener is attached to the second collar fastener into a tensile force between the fasteners.

11. The collar recited in claim 1, wherein a retention force between the fasteners when engaged is greater in the shear direction than in the tensile direction.

12. A seat for a vehicle comprising:
    a seat back;
    a first collar support having a first end and a second end, the first end being attached to the seat back, the second end having a fastener; and
    a second collar support having a first end and a second end, the first end being attached to the seat back, the second end having a fastener;
    wherein the first collar support fastener releasably engages the second collar support fastener, the second collar support being separate from the first collar support when the second collar support is disengaged from the first collar support, and the first and second collar supports form a closed loop with the seat back around the neck of an occupant of the seat when the fasteners are engaged to each other.

13. The seat recited in claim 12, wherein a retention force between the fasteners when engaged is greater in the shear direction than in the tensile direction.

14. The seat recited in claim 12, wherein the first and second collar support each comprise:
    a body having an attachment end and a coupling end, the coupling end including the collar support second end and the respective collar fastener;
    a cushion fill material retained with the body; and
    an attachment strap connected to the body attachment end for connecting with the seat back.

15. The seat recited in claim 14, wherein the attachment strap forms a loop, and wherein a first side of the attachment strap includes the first side of a hook and loop fastener, and a second side of the attachment strap includes the second side of a hook and loop fastener.

16. The seat recited in claim 14, wherein the body is substantially tubular.

17. The seat recited in claim 14, wherein the body is substantially arcuate.

18. A seat for a vehicle comprising:
    a seat back;
    a first collar support having a first end and a second end, the first end being attached to the seat back, the second end having a fastener; and a second collar support having a first end and a second end, the first end being attached to the seat back, the second end having a fastener;

wherein the first collar support fastener releasably engages the second collar support fastener and the first and second collar support form a closed loop with the seat back around the neck of an occupant of the seat when the fasteners are engaged to each other;

wherein the first and second collar support each comprise:
  a body having an attachment end and a coupling end, the coupling end including the collar support second end and the respective collar fastener;
  a cushion fill material retained with the body; and
  an attachment strap connected to the body attachment end for connecting with the seat back;
  wherein the body is substantially arcuate;

wherein the substantially arcuate body of each collar support is adapted to translate a force applied against the arcuate body when the first collar fastener is attached to the second collar fastener into a tensile force between the fasteners.

19. A safety collar comprising:

a seat; and a collar attached to the seat, the collar comprising:
  a first collar portion having an end portion, the end portion having a fastener attached thereto; and
  a second collar portion having an end portion for releasably engaging the fastener of the first collar portion for forming a closed loop around the neck of an occupant of the seat when the end portions engage each other, the second collar being separate from the first collar when the end portion is disengaged from the fastener of the firs collar.

20. The seat recited in claim 19, wherein the fastener includes a first part of a hook and loop fastener.

* * * * *

UNITED STATES PATENT AND TRADEMARK OFFICE
CERTIFICATE OF CORRECTION

PATENT NO. : 6,789,851 B2
DATED : September 14, 2004
INVENTOR(S) : Carol J. Smith It is certified that error appears in the above-identified patent and that said Letters Patent is hereby corrected as shown below:

Title page,
Item [*] Notice, please insert -- This patent is subject to a terminal disclaimer --

Column 8,
Line 20, please replace "fist" with -- first --

Column 10,
Line 15, please replace "firs" with -- first --

Signed and Sealed this

Twenty-eighth Day of June, 2005

JON W. DUDAS
*Director of the United States Patent and Trademark Office*